United States Patent
Chae (10) Patent No.: US 6,950,144 B2
(45) Date of Patent: Sep. 27, 2005

(54) APPARATUS AND METHOD OF CONTROLLING IMAGE DISPLAY

(75) Inventor: Seung-soo Chae, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 459 days.

(21) Appl. No.: 10/011,733

(22) Filed: Dec. 11, 2001

(65) Prior Publication Data

US 2002/0109786 A1 Aug. 15, 2002

(30) Foreign Application Priority Data

Feb. 15, 2001 (KR) .......................................... 2001-7610

(51) Int. Cl.⁷ ................................................ H04N 9/44
(52) U.S. Cl. ...................... 348/513; 348/523; 348/526; 348/425.4; 348/715; 345/213; 345/545; 375/357; 375/240.28
(58) Field of Search ................................ 348/513, 500, 348/501, 523, 526, 516, 515, 522, 715, 423.1, 425.4, 194; 345/204, 213, 545, 546, 547; 375/357, 360, 240.28; 714/3, 12, 707, 775

(56) References Cited

U.S. PATENT DOCUMENTS

| | | | | |
|---|---|---|---|---|
| 5,461,487 A | * | 10/1995 | Asakura ...................... | 386/90 |
| 5,502,572 A | * | 3/1996 | Kuroda ........................ | 386/84 |
| 5,572,496 A | * | 11/1996 | Hayashi et al. .......... | 369/59.18 |
| 5,798,804 A | * | 8/1998 | Okitsu .................... | 375/240.26 |
| 6,006,352 A | * | 12/1999 | Kitabatake .................. | 714/752 |
| 6,259,704 B1 | * | 7/2001 | Asahina et al. ............. | 370/460 |
| 6,262,777 B1 | * | 7/2001 | Brewer et al. .............. | 348/515 |
| 6,337,883 B1 | * | 1/2002 | Tanaka .................. | 375/240.25 |
| 6,381,281 B1 | * | 4/2002 | Higurashi .............. | 375/240.26 |
| 2002/0094049 A1 | * | 7/2002 | Aslanis et al. .............. | 375/365 |

FOREIGN PATENT DOCUMENTS

GB      2351403 A  * 12/2000  ........... H04B/17/00

* cited by examiner

Primary Examiner—John Miller
Assistant Examiner—Jean W. Désir
(74) Attorney, Agent, or Firm—Staas & Halsey LLP (57) ABSTRACT

An apparatus and a method of controlling image display in an image display apparatus having a panel and wherein an image output is synchronized to a frame synchronization signal of an input signal. The method includes determining whether or not an input synchronization signal is an abnormal synchronization signal, processing the abnormal synchronization signal if the input synchronization is the abnormal synchronization signal, and removing damaged frame data if the abnormal synchronization signal is processed.

26 Claims, 5 Drawing Sheets

APPARATUS AND METHOD OF CONTROLLING IMAGE DISPLAY

CROSS-REFERENCE TO RELATED APPLICATION

This application claims the benefit of Korean Application No. 2001-7610, filed Feb. 15, 2001, in the Korean Industrial Property Office, the disclosure of which is incorporated herein by reference.

BACKGROUND OF THE INVENTION

1. Field of the Invention

The present invention relates to a system for image display, and more particularly, to an apparatus and a method of controlling image display.

2. Description of the Related Art

An abnormal frame synchronization signal, in various image-outputting devices, such as a television, is a frame synchronization signal that is inputted earlier or later than the normal timing due to an external shock or noise, channel switching, TV/VCR switching, or static electricity. An abnormal frame synchronization signal may cause a screen failure or damage the display device.

Figure 1:
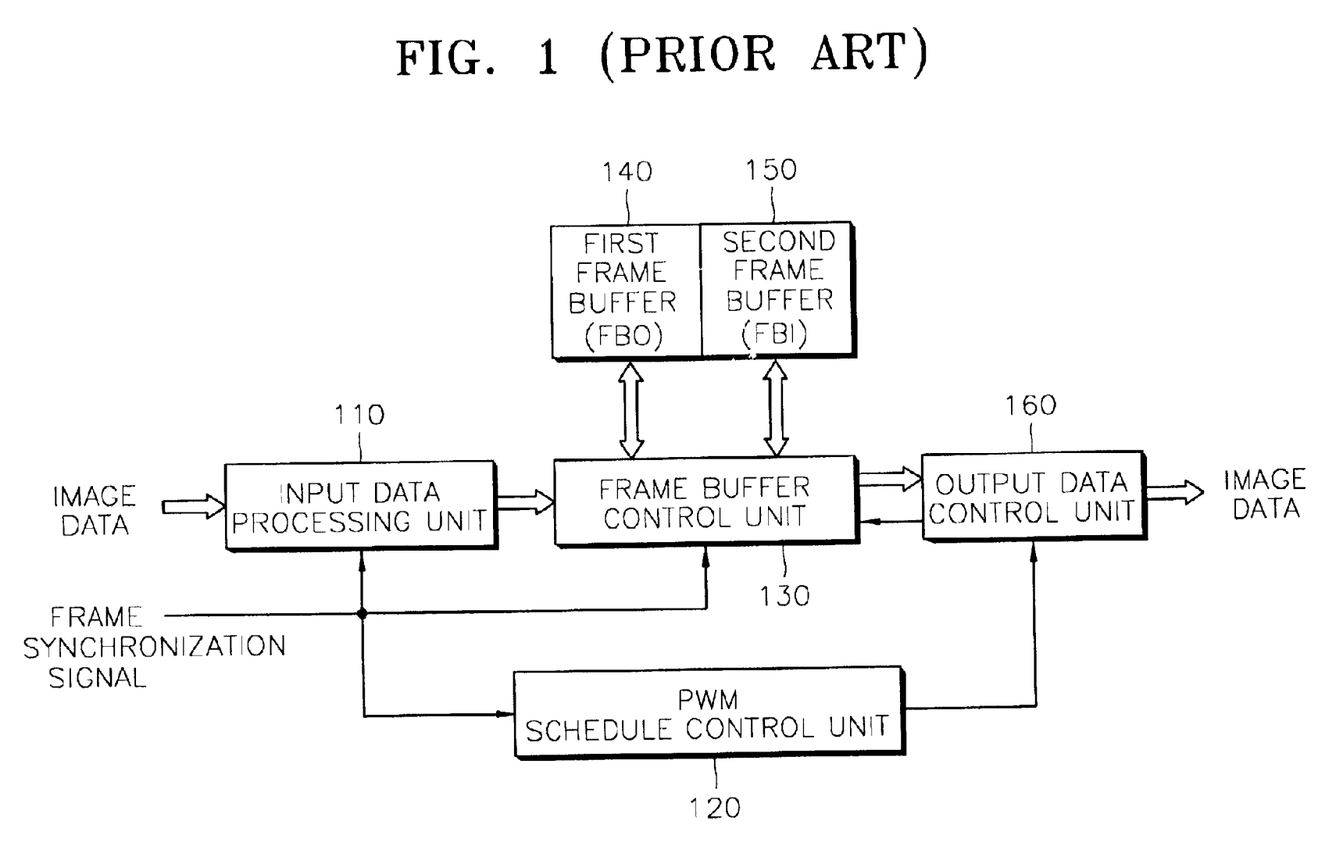
FIG. 1 is a schematic diagram of a conventional apparatus for controlling image display.
Figures 2A, 2B:
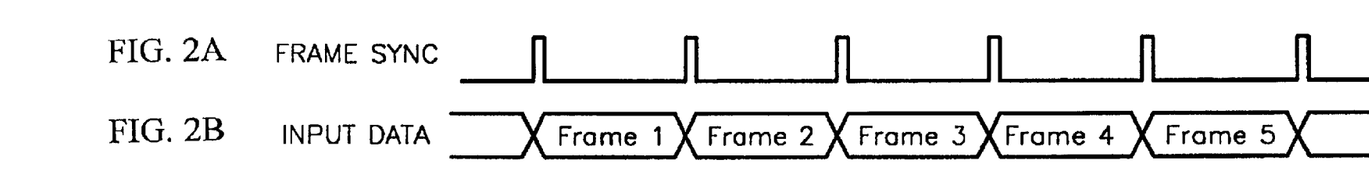
FIGS. 2A through 2G are timing diagrams of the operation of the apparatus shown in FIG. 1 when a frame synchronization signal is normally input.
Figure 2C:
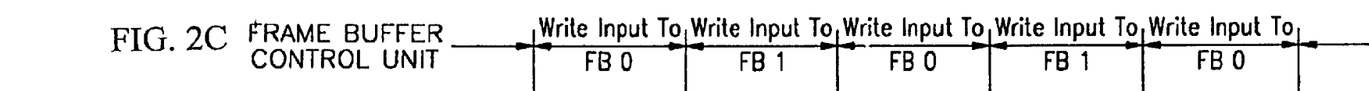
Figure 2D:
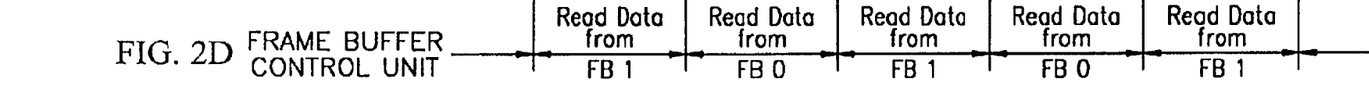
Figure 2E:
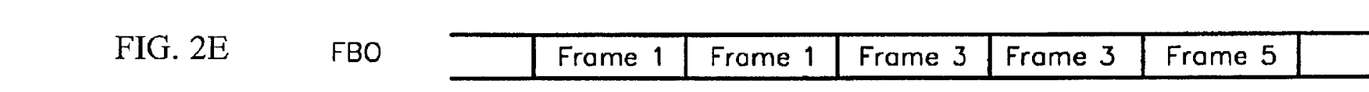
Figure 2F:
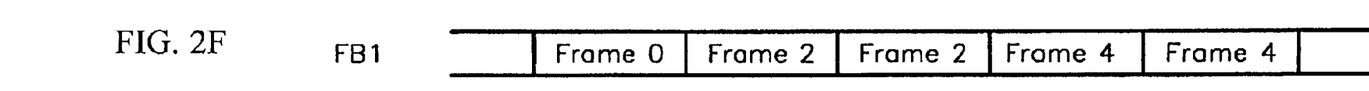
Figure 2G:
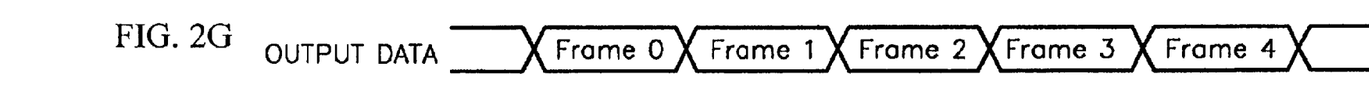
Figure 3A:
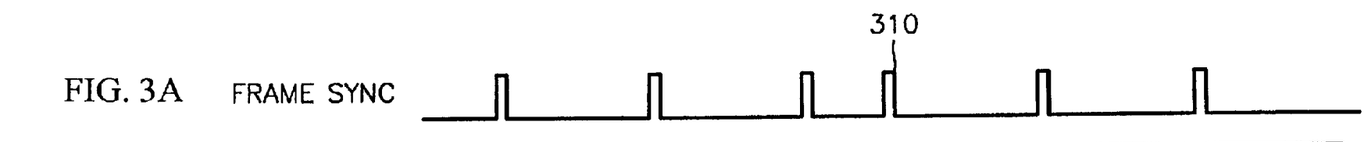
FIGS. 3A through 3G are timing diagrams of the operation of the apparatus shown in FIG. 1 when a frame synchronization signal is abnormally input.
Figure 3B:
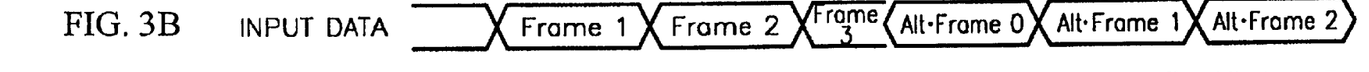
Figure 3C:
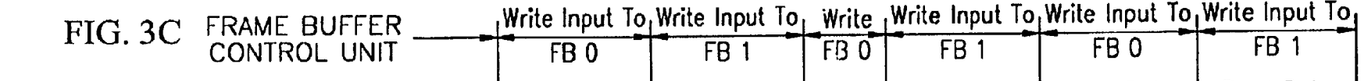
Figure 3D:
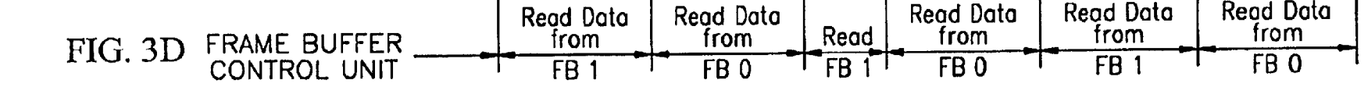
Figure 3E:
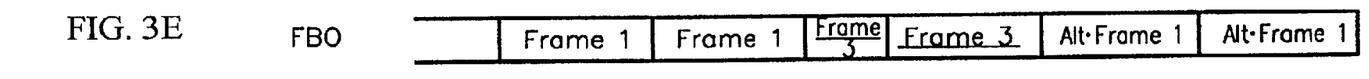
Figure 3F:
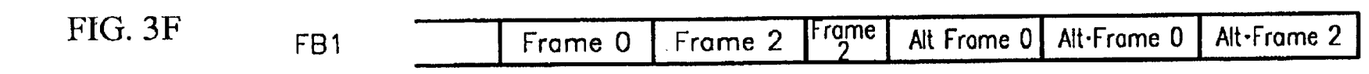
Figure 3G:
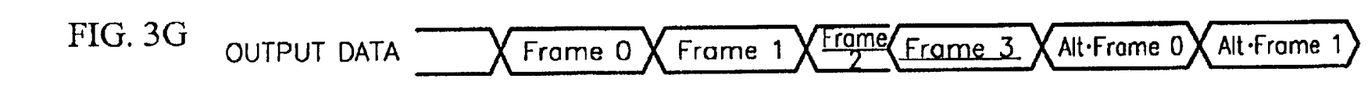

FIG. 1 is a schematic diagram of a conventional apparatus for controlling image display. Referring to FIG. 1, an input data processing unit 110 reconstructs image data that is generally input in a raster scan method into units of a bit plane with respect to a frame synchronization signal, and outputs the image data to a frame buffer control unit 130. An output data control unit 160 outputs predetermined plane data in a frame that is generated in the frame buffer control unit 130, according to a pulse width modulation (PWM) schedule, to a panel.

The frame buffer control unit 130 directly controls a first frame buffer (FB0) 140 and a second frame buffer (FB1) 150 with respect to the frame synchronization signal. That is, the frame buffer control unit 130 alternately stores data received from the input data processing unit 110 into either of the frame buffers 140 and 150 in each frame cycle, and alternately reads data from either of the frame buffers 140 and 150 according to the request of the output data control unit 160.

The PWM schedule control unit 120 performs image display routines, such as data rearrangement, in units of a frame, and controls the output data control unit 160 with respect to the frame synchronization signal to determine an output timing of each bit plane value so that the display panel can express the gradation of an image.

The conventional apparatus for controlling image display shown in FIG. 1 cannot output the data input in the same synchronization period due to the characteristic of a PWM driving method. Therefore, the apparatus show in FIG. 1 has two frame buffers, the first frame buffer 140 and the second frame buffer 150, so that the apparatus stores a frame and outputs the stored frame value when the next frame is input.

FIGS. 2A through 2G are timing diagrams of the operation of the apparatus shown in FIG. 1 when a frame synchronization signal (FIG. 2A) is normally input. Referring to FIG. 1 and FIGS. 2A through 2G, the frame buffer control unit 130 stores a frame (Frame 1 in FIG. 2B) that is input through the input data processing unit 110 in the first frame buffer (FB0 in FIG. 2E) 140, which is set as an input buffer, and if the output data control unit 160 requests frame data, reads data from the second frame buffer (FB1 in FIG. 2F) 150, which is set as an output buffer. The PWM schedule control unit 120 determines the data-read time of the output data control unit 160. Then, the frame buffer control unit 130 repeats the same operation from the beginning if another frame synchronization signal is input after the one frame cycle. Thus, the frame buffer control unit 130 resets the first frame buffer (FB0 in FIG. 2E) 140, which is an input buffer, to an output buffer and the second frame buffer (FB1 in FIG. 2F) 150, which is an output buffer, to an input buffer. The frame buffer control unit 130 stores the current frame (Frame 2 in FIG. 2B) in the second frame buffer (FB1 in FIG. 2F) 150 instead of the previous frame (Frame 0 in FIG. 2F), and outputs the frame (Frame 1 in FIG. 2G) that was stored in the first frame buffer (FB0 in FIG. 2E) 140. Accordingly, each input data signal is sequentially output to the display panel one frame cycle after the data signal was originally input.

FIGS. 3A through 3G are timing diagrams of the operation of the apparatus shown in FIG. 1 when a frame synchronization signal is abnormally input. A normal frame synchronization signal does not cause a problem in the conventional apparatus for controlling image display. However, that is not the case if channel switching, signal switching, or static electricity causes the frame synchronization signal to be input momentarily earlier or later than the normal input timing.

Referring to FIG. 1 and FIGS. 3A through 3G, if an abnormal frame synchronization signal (310 in FIG. 3A) occurs when a frame (Frame 3 in FIG. 3B) is written into the first frame buffer (FB0 in FIG. 3E) 140, the frame buffer control unit 130 begins to write new channel data (Alt Frame 0 in FIG. 3B) to the second frame buffer (FB1 in FIG. 3F) 150. At the same time, the frame buffer control unit 130 stops outputting the frame (Frame 2 in FIG. 3G) stored in the second frame buffer (FB1 in FIG. 3F) 150 in the middle of the output, and reads the data stored in the first frame buffer (FB0 in FIG. 3E) 140. Since an incomplete frame (Frame 3 in FIG. 3B) is stored in the first frame buffer (FB0 in FIG. 3E) 140, the frame buffer control unit 130 inevitably outputs the frame (Frame 3 in FIG. 3B) having damaged data. This damaged data becomes an eyesore, obstructs smooth viewing, and causes serious damage to the display panel. For example, if a ferro liquid crystal display (FLCD) suffers stress, FLCD shows a kind of irrecoverable afterimage effect. To prevent this, FLCD performs a kicking operation according to the PWM schedule that is performed at the back-end part of the one frame cycle. However, the damaged frame in the image display apparatus, which operates as shown in FIGS. 3A through 3G, cannot perform the kicking operation. Without the preventive kicking operation, the FLCD panel suffers stress and repetitive stress may have a bad effect on the display performance and the life span of the display panel.

SUMMARY OF THE INVENTION

It is a first object of the present invention to provide a method of controlling image display in an image display system which minimizes a screen failure and/or prevents display panel damage by processing an abnormally input frame synchronization signal, and using the processed frame synchronization signal as an output synchronization signal.

It is a second object of the present invention to provide an apparatus for controlling image display, to which the method of controlling image display is applied.

Additional objects and advantages of the invention will be set forth in part in the description which follows and, in part, will be obvious from the description, or may be learned by practice of the invention.

To accomplish the above and other objects of the present invention, there is provided a method of controlling image display, in a method of displaying an image output synchronized to a frame synchronization signal of an input signal, comprising determining whether or not an input frame synchronization signal is an abnormal frame synchronization signal, processing the abnormal frame synchronization signal if the input frame synchronization is the abnormal frame synchronization signal, and removing damaged frame data resulting from the abnormal frame synchronization signal if the abnormal synchronization signal is processed.

To accomplish the above and other objects of the present invention, there is provided an apparatus for controlling image display, in an image display apparatus wherein an image output is synchronized to a frame synchronization signal of an input signal, the apparatus for controlling image display comprising an input data processing unit which reconstructs input image data with respect to a frame synchronization signal into units of a bit plane, a masking unit which masks the frame synchronization signal that is input before a predetermined cycle as an abnormal frame synchronization signal, a schedule control unit which determines an output timing of the bit plane data with respect to the frame synchronization signal masked in the masking unit, a toggle control unit which detects the frame synchronization signal that is input before the predetermined cycle and determines a toggle timing of an input and/or output buffer(s) according to whether the frame synchronization signal is removed, a frame buffer control unit which differently controls the input and/or output buffer(s) of the bit plane data processed in the input data processing unit according to the decision of the toggle control unit, and an output data control unit which requests the bit plane data from the frame buffer control unit according to a display process end signal that is generated in a predetermined cycle unit in the schedule control unit and outputs the bit plane data to a panel.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 4:
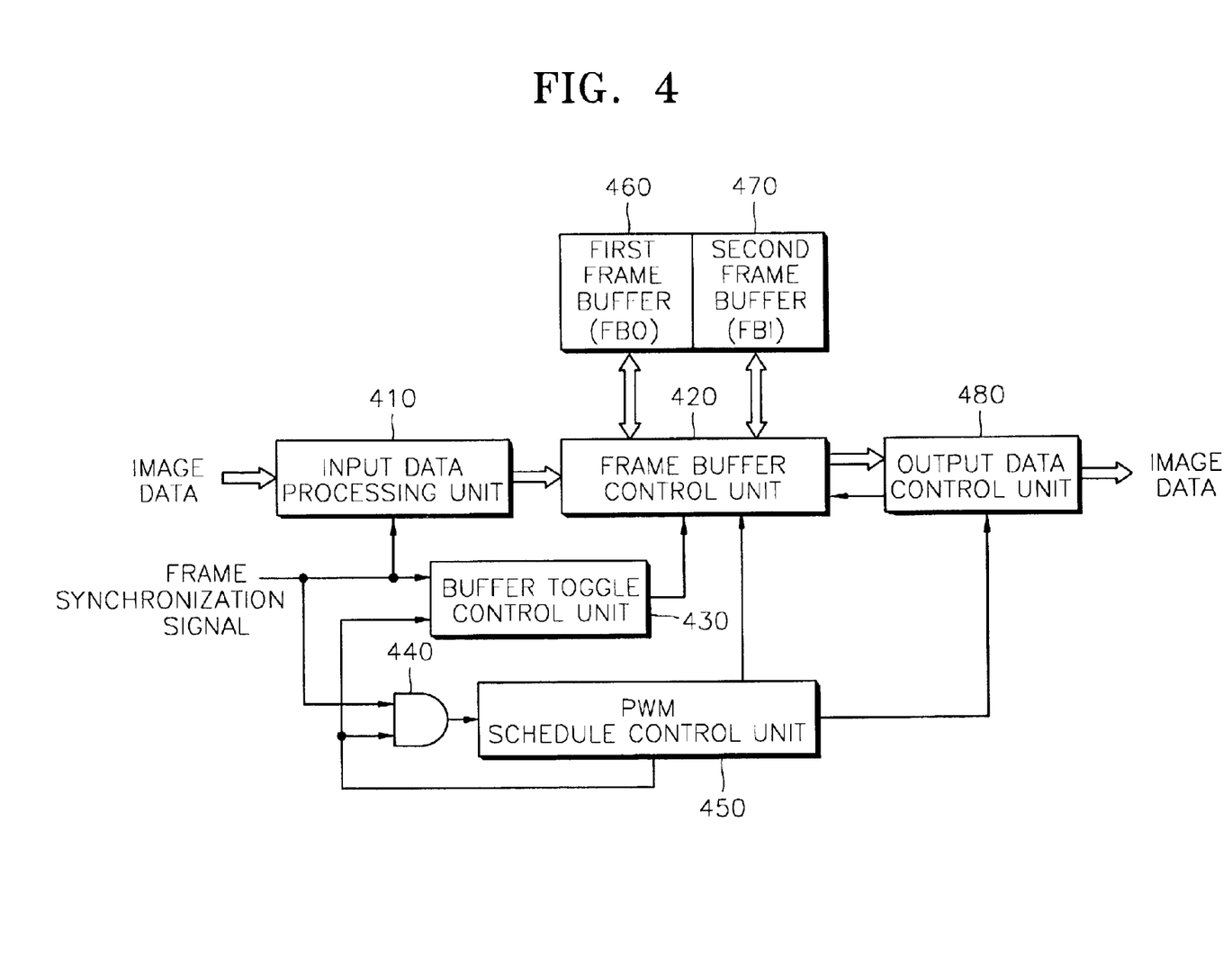
FIG. 4 is a schematic diagram of an apparatus for controlling image display according to the present invention.
Figure 5A:
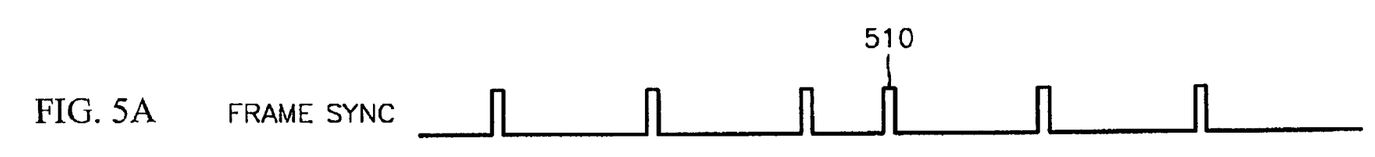
FIGS. 5A through 5I are timing diagrams of the operation of the apparatus shown in FIG. 4 when a frame synchronization signal is abnormally input.
Figures 5B, 5C:
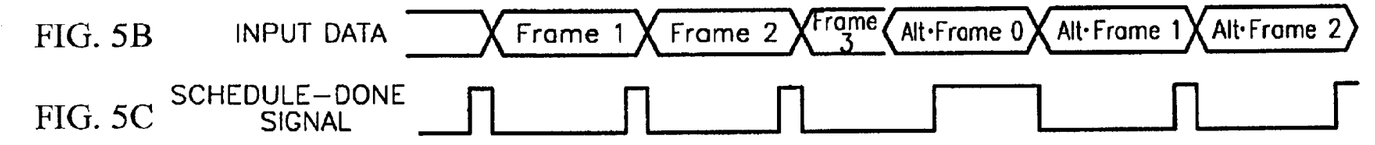
Figure 5D:
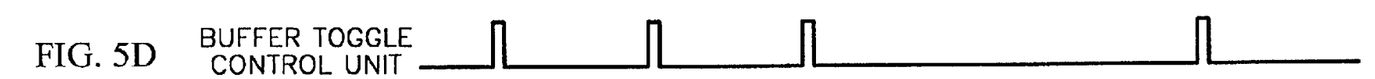
Figure 5E:
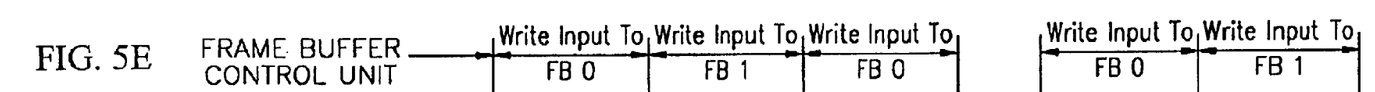
Figure 5F:
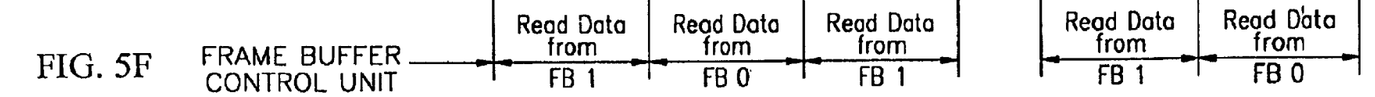
Figure 5G:
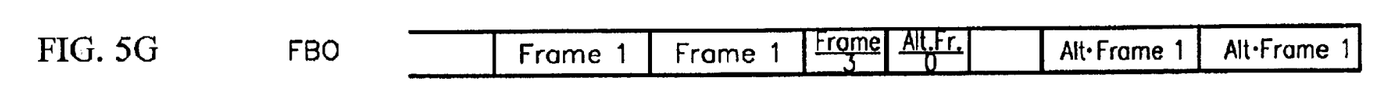
Figure 5H:
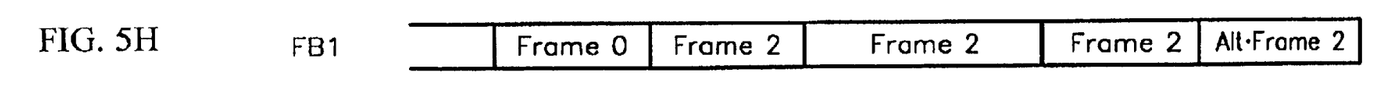
Figure 5I:
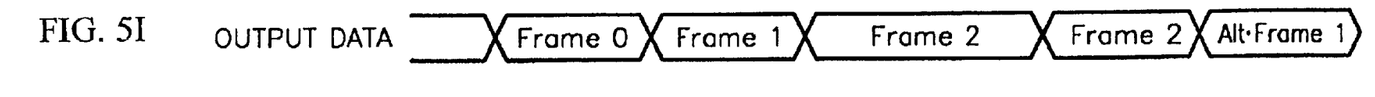

FIG. 4 shows a schematic diagram of an apparatus for controlling image display according to the present invention. When a frame synchronization signal is input normally, the apparatus shown in FIG. 4 processes the signal without difficulty, much like the conventional apparatus for controlling image display. However, to process a frame synchronization signal that is abnormally input, the apparatus shown in FIG. 4 has a masking unit 440 and a buffer toggle control unit 430.

Referring to FIG. 4, an input data processing unit 410 reconstructs an image data that is normally input in a raster scan method into units of a bit plane with respect to a frame synchronization signal, and outputs the image data to a frame buffer control unit 420.

An output data control unit 480 requests a predetermined bit plane data from the frame buffer control unit 420 according to a PWM schedule control signal, which corresponds to a routine for displaying an image in each frame, and outputs the bit plane data to a panel.

The frame buffer control unit 420 directly controls a first frame buffer (FB0) 460 and a second frame buffer (FB1) 470 with respect to the frame synchronization signal. More specifically, the frame buffer control unit 420 alternately stores data that is processed in the input data processing unit 410 into either of the frame buffers 460 and 470 in each frame cycle, and alternately reads data from either of the frame buffers 460 and 470 according to a request from the PWM schedule control unit 450 or the output data control unit 480.

The PWM schedule control unit 450 generates a schedule-done signal if a schedule corresponding to a routine for displaying an image in units of a frame is completely performed normally. Also, the PWM schedule control unit 450 controls the output data control unit 480 according to a combination of the frame synchronization signal and the schedule-done signal to determine the output timing of each bit plane value so that the display panel can express the gradation of the image. The cycle or waveform of the schedule-done signal may be adjusted through a microcomputer (not shown) outside the system.

The first frame buffer (FB0) 460 and the second frame buffer (FB1) 470 store the previous frame and the current frame, respectively, under the control of the frame buffer control unit 420.

The masking unit 440 determines and masks a frame synchronization signal that is input before a schedule-done signal is generated, as an abnormal synchronization signal, by ANDing a schedule-done signal that is generated in the PWM schedule control unit 450 and the frame synchronization signal. In other words, the masking unit 440 makes the abnormal synchronization signal '0.'

The buffer toggle control unit 430 ANDs a schedule-done signal and a frame synchronization signal, stores the result of the AND operation, and then determines toggling of the first frame buffer (FB0) 460 and the second frame buffer (FB1) 470. That is, the buffer toggle control unit 430 does not toggle the frame buffers 460 and 470 if the currently input frame synchronization signal is an abnormal signal. Only when the frame synchronization signal is a normal signal, does the buffer toggle control unit 430 send a toggle control signal to the frame buffer control unit 420 so that the frame buffers 460 and 470 are toggled.

FIGS. 5A through 5I are timing diagrams of the operation of the apparatus shown in FIG. 4 when a frame synchronization signal is abnormally input. Referring to FIG. 4 and FIGS. 5A through 5I, the PWM schedule control unit 450 makes the schedule-done signal '1' if a necessary schedule is completely performed. If an abnormal frame synchronization signal (510 in FIG. 5A) is input, the PWM schedule control unit 450 makes the schedule-done signal '0' because the schedule needs to be performed again from the beginning. ANDing this schedule-done signal and input frame synchronization signal removes the frame synchronization signal that is input before the schedule is completely performed. Therefore, the frame buffer control unit 420 uses a processed frame synchronization signal. Whenever an abnormal frame synchronization signal 510 is input, the buffer toggle control unit 430 does not generate a toggle control signal for toggling the input and output buffers. If a recent frame synchronization signal is removed, it is highly probable that the data stored in the first frame buffer (FB0 in FIG. 3G) 460, which is set as the current input buffer, is damaged data. Accordingly, the buffer toggle control unit 430 stores information on whether or not the last frame synchronization signal is removed and does not generate a toggle control signal. Therefore, the first frame buffer (FB0 in FIG. 3G) is again used as an input buffer and cannot be used as an output buffer.

More specifically, referring to the timing diagrams shown in FIGS. 5A through 5I, if an abnormal frame synchronization signal (510 in FIG. 5A) is generated in the middle of writing a frame (Frame 3 in FIG. 5B) into the first frame buffer (FB0 in FIG. 5G) 460, the frame buffer control unit 420 neglects the frame synchronization signal (510 in FIG. 5A) based on a toggle control signal generated in the buffer toggle control unit 420 because the schedule-done signal is '0'. At this time, the frame buffer control unit 420 stores the damaged data (Frame 3 in FIG. 5B) in the first frame buffer (FB0 in FIG. 5G) 460, which is an input buffer. The data is damaged because the input value is changed (Frame 3 to Alt Frame 0 in FIG. 5B) in the middle of the frame. However, the frame buffer control unit 420 outputs a normal frame (Frame 2 in FIG. 5B) in the second frame buffer (FB1 in FIG. 5H) 470, which is an output buffer, and if necessary, secures time for additional operations, such as a kicking operation.

Also, if the schedule-done signal is '1' and a frame (Alt. Frame 1 in FIG. 5B) from another source is input together with the next frame synchronization signal, the frame buffer control unit 420 sets the first frame buffer (FB0 in FIG. 5G) 460 as an input buffer and the second frame buffer (FB1 in FIG. 5H) 470 as an output buffer, as in normal operation, because the abnormal frame synchronization signal is removed. Then, the frame buffer control unit 420 stores the frame (Alt. Frame 1 in FIG. 5B) from the other source into the first frame buffer (FB0 in FIG. 5G) 460 and outputs the frame (Frame 2 in FIG. 5B) in the second frame buffer (FB1 in FIG. 5H) 470 once more.

As described above, according to the present invention, by processing an abnormal frame synchronization signal, damage to a display device and screen failures, which obstruct smooth viewing, are minimized.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of controlling image display, when displaying an image output synchronized to a frame synchronization signal of an input signal, the method comprising:

determining whether an input frame synchronization signal is an abnormal frame synchronization signal instead of a normally input frame synchronization signal;

processing the abnormal frame synchronization signal if the input frame synchronization signal is determined to be the abnormal synchronization signal; and removing damaged frame data from a frame buffer resulting from the abnormal frame synchronization signal if the abnormal frame synchronization signal is processed.

2. The method of claim 1, wherein the determining whether the input frame synchronization signal is the abnormal frame synchronization signal comprises using an end signal of an image display routine and the frame synchronization signal.

3. The method of claim 2, wherein the abnormal frame synchronization signal is the frame synchronization signal that is input before the end signal of the image display routine generated for each frame unit.

4. The method of claim 1, wherein the processing comprises removing the abnormal frame synchronization signal from an operation of controlling image display.

5. The method of claim 1, wherein the removing the damaged frame data comprises repeatedly outputting stored frame data from another frame buffer at least once in response to the abnormal synchronization signal being processed.

6. The method of claim 1, wherein the determining comprises ANDing an end signal of an image display routine and the frame synchronization signal, wherein the abnormal frame synchronization signal is the frame synchronization signal that is input before the end signal of the image display routine.

7. The method claim of 6, wherein the determining further comprises adjusting a cycle of the end signal of the image display routine.

8. An apparatus for controlling image display, in an image display apparatus having a panel and wherein an image output is synchronized to a frame synchronization signal of an input signal, the apparatus for controlling the image display comprising:

an input data processing unit which reconstructs input image data with respect to the frame synchronization signal into units of a bit plane;

a masking unit which masks the frame synchronization signal that is input before a predetermined cycle as an abnormal frame synchronization signal;

a schedule control unit which determines an output timing of a bit plane value with respect to the frame synchronization signal masked in the masking unit;

a toggle control unit which detects the frame synchronization signal that is input before the predetermined cycle, and determines a toggle timing of an input and/or output buffer according to whether the frame synchronization signal is masked;

a frame buffer control unit which differently controls the input and/or output buffer of the input image data processed in the input data processing unit according to the detection of the toggle control unit; and an output data control unit which requests the input image data from the frame buffer control unit according to a display process end signal that is generated in a predetermined cycle unit in the schedule control unit, and outputs the input image data to the panel.

9. The apparatus of claim 8, wherein the masking unit ANDs an end signal of an image display routine and the frame synchronization signal to determine whether the frame synchronization signal is the abnormal frame synchronization signal.

10. The apparatus of claim 9, wherein the schedule control unit generates the end signal of the image display routine in each frame.

11. The apparatus of claim 8, wherein the toggle control unit determines the abnormal frame synchronization signal from the frame synchronization signal by detecting the frame synchronization signal that is input before the predetermined cycle and, in response, providing information for toggling the input and/or output buffer(s) to the frame buffer control unit.

12. The apparatus of claim 8, wherein the toggle control unit ANDs an end signal of an image display routine and the frame synchronization signal and delays the result of the ANDing operation.

13. The apparatus of claim 8, wherein the toggle control unit generates a control signal so that a frame buffer is toggled in responds to a normally input frame synchronization signal, instead of the abnormal frame synchronization signal.

14. The apparatus of claim 8, wherein:
the masking unit ANDs an end signal of an image display routine generated in each frame and the frame synchronization signal; and
the toggle control unit determines the abnormal frame synchronization signal from a normally input frame synchronization signal by detecting that the frame synchronization signal is input before the predetermined cycle and, in response, providing information for toggling the input and/or output buffer(s) to the frame buffer control unit.

15. The apparatus of claim 8, wherein:
the masking unit ANDs an end signal of an image display routine generated in each frame and the frame synchronization signal; and
the toggle control unit ANDs the end signal of the image display routine and the frame synchronization signal and delays the result of the ANDing operation.

16. The apparatus of claim 8, wherein:
the masking unit ANDs an end signal of an image display routine generated in each frame and the frame synchronization signal; and
the toggle control unit generates a control signal so that a frame buffer is toggled in response to a normally input frame synchronization signal, instead of the abnormal frame synchronization signal.

17. A method of controlling image display when displaying an image output synchronized to a frame synchronization signal of an input signal, the method comprising:
determining whether the frame synchronization signal is an abnormal frame synchronization signal or a normally input frame synchronization signal; and
toggling first and second buffers as input and output buffers each time the frame synchronization is the normally input frame synchronization signal and not toggling the first and second buffers each time the frame synchronization signal is the abnormal frame synchronization signal.

18. The method of claim 17, wherein the determining comprises:
using a schedule-done signal indicative of a schedule corresponding to a routine for displaying the image in units of a frame being completely performed normally to determine whether the frame synchronization signal is the abnormal frame synchronization signal.

19. The method of claim 18, wherein the using comprises:
performing a logic operation on the schedule-done signal and the frame synchronization signal; and
determining the frame synchronization signal to be the abnormal frame synchronization signal when the frame synchronization signal is input before the schedule-done signal.

20. An apparatus for controlling an image display of image data on a display device using a frame synchronization signal, the apparatus comprising:
an input processing unit which reconstructs the image data in accordance with the frame synchronization signal;
first and second frame buffers which alternately act as input and output buffers for the image data;
a determination unit which determines whether the frame synchronization is an abnormal frame synchronization signal or a normally input frame synchronization signal;
a frame buffer control unit which toggles the first and second frame buffers as the input and output each time the frame synchronization is the normally input frame synchronization signal and maintains the first and second buffers as the current input and output buffers each time the frame synchronization signal is the abnormal frame synchronization signal; and
an output data control unit which requests the image data from the frame buffer control unit, and outputs the requested image data to the display device.

21. The apparatus of claim 20, further comprising:
a schedule control unit which determines an output timing of a bit plane value of the image data based upon the frame synchronization signal, to output an end signal;
wherein:
the output data control unit requests the image data from the frame buffer control unit according to a display process end signal that is generated in a predetermined cycle unit, and
the determination unit determines whether the frame synchronization signal is input before the end signal, and if so, determines the frame synchronization signal to be the abnormal frame synchronization signal.

22. The apparatus of claim 21, wherein the determination unit comprises:
a first logic circuit which performs a first logic operation on the frame synchronization signal and the end signal, to mask the frame synchronization signal that is input prior to the end signal, and outputs the result to the schedule control unit; and
a second logic circuit which performs a second logic operation on the frame synchronization signal and the end signal, and outputs the result to control the toggling by the frame buffer control unit.

23. A method of controlling image display when displaying an image output synchronized to a frame synchronization signal of an input signal, the method comprising:
determining whether the frame synchronization signal is an abnormal frame synchronization signal or a normally input frame synchronization signal;
toggling a current input frame buffer as an output frame buffer and toggling a current output frame buffer as an input frame buffer each time the frame synchronization signal is the normally input frame synchronization signal, and otherwise, removing damaged frame data from the input frame buffer resulting from the abnormal synchronization signal, which obstructs smooth viewing, wherein removing comprises:

not toggling the current input frame buffer containing the damaged frame data as the output frame buffer and not toggling the current output frame buffer containing previous frame data as the input frame buffer, replacing the damaged frame data with next frame data in the current input frame buffer, and repeatedly outputting the previous frame data from the current output frame buffer at least once.

24. The method of claim 23, wherein the determining comprises ANDing an end signal of an image display routine and the frame synchronization signal, wherein the abnormal frame synchronization signal is the frame synchronization signal that is input before the end signal of the image display routine.

25. An apparatus for controlling an image display of image data on a display device using a frame synchronization signal, the apparatus comprising:

an input processing unit which reconstructs the image data in accordance with the frame synchronization signal;

first and second frame buffers which alternately act as input and output buffers for the image data;

a buffer toggle control unit which detects whether the frame synchronization signal is an abnormal synchronization signal or a normally input frame synchronization signal, and only generates and sends toggling signal to a frame buffer control unit when the normally input synchronization signal is detected;

a frame buffer control unit which toggles the first and second frame buffers to alternately act as the input and output buffers each time the toggling signal is received, and otherwise removes damaged image data by maintaining the first and second buffers as the current input and output buffers wherein:

next image data replaces the damages image data in the current input buffer, and previous image data in the current output buffer repeatedly acts output image data; and an output data control unit which requests the output image data from the frame buffer control unit, and outputs the requested output image data to the display device.

26. The apparatus of claim 25, further comprising:

a schedule control unit which determines an output timing of a bit plane value of the image data based upon the frame synchronization signal, to output an end signal;

wherein:

the output data control unit requests the output image data from the frame buffer control unit according to a display process end signal that is generated in a predetermined cycle unit, and the buffer toggle control unit detects whether the frame synchronization signal is input before the end signal, and if so, detects the frame synchronization signal to be the abnormal frame synchronization signal.

* * * * *

UNITED STATES PATENT AND TRADEMARK OFFICE
CERTIFICATE OF CORRECTION

PATENT NO. : 6,950,144 B2
APPLICATION NO. : 10/011733
DATED : September 27, 2005
INVENTOR(S) : Seung-soo Chae It is certified that error appears in the above-identified patent and that said Letters Patent is hereby corrected as shown below:

Column 6, line 34, replace "claim of 6" with --of claim 6--, therefor;

Column 7, line 19, replace "in responds" with --in response--, therefor;

Column 10, line 7, replace "damages" with --damaged--, therefor.

Signed and Sealed this

Twenty-second Day of January, 2008

JON W. DUDAS
*Director of the United States Patent and Trademark Office*